United States Patent
Segalov

(10) Patent No.: US 8,869,134 B2
(45) Date of Patent: Oct. 21, 2014

(54) UPDATING FIRMWARE ON MOBILE ELECTRONICE DEVICES

(75) Inventor: Yaron Segalov, Tel Aviv (IL)

(73) Assignee: Google Inc., Mountain View, CA (US)

( * ) Notice: Subject to any disclaimer, the term of this patent is extended or adjusted under 35 U.S.C. 154(b) by 1303 days.

(21) Appl. No.: 12/418,595

(22) Filed: Apr. 5, 2009

(65) Prior Publication Data

US 2009/0254897 A1    Oct. 8, 2009

Related U.S. Application Data

(60) Provisional application No. 61/123,314, filed on Apr. 7, 2008.

(51) Int. Cl.
  G06F 9/44 (2006.01)
  H04M 1/725 (2006.01)
  H04M 1/02 (2006.01)

(52) U.S. Cl.
  CPC ............. *G06F 8/68* (2013.01); *H04M 1/72525* (2013.01); *H04M 1/72575* (2013.01); *H04M 1/72527* (2013.01); *H04M 1/0254* (2013.01)
  USPC ....................................................... 717/173

(58) Field of Classification Search
  USPC ....................................................... 717/173
  See application file for complete search history.

(56) References Cited

U.S. PATENT DOCUMENTS

| | | |
|---|---|---|
| 5,625,673 A | 4/1997 | Grewe et al. |
| 5,628,055 A | 5/1997 | Stein |
| 5,809,115 A | 9/1998 | Inkinen |
| 5,893,037 A | 4/1999 | Reele et al. |
| 5,907,815 A | 5/1999 | Grimm et al. |
| 6,188,917 B1 | 2/2001 | Laureanti |
| 6,201,867 B1 | 3/2001 | Koike |
| 6,243,578 B1 | 6/2001 | Koike |
| 6,477,357 B1 | 11/2002 | Cook |
| 6,516,202 B1 | 2/2003 | Hawkins et al. |

(Continued)

FOREIGN PATENT DOCUMENTS

| | | |
|---|---|---|
| EP | 1871075 A1 | 12/2007 |
| WO | 9421058 A1 | 9/1994 |

(Continued)

OTHER PUBLICATIONS

Beasley et al. (PCT publication WO 96/32679, dated Oct. 17, 1996).*

*Primary Examiner* — Li B Zhen
*Assistant Examiner* — Hang Pan
(74) *Attorney, Agent, or Firm* — Soquel Group LLC

(57) ABSTRACT

A system for updating firmware on electronic devices, including an electronic device including a processor, a storage for storing a current image of firmware that includes a baseline image of firmware, an update utility for updating the firmware stored in the storage, and a connector for connecting the electronic device to a jacket, and a jacket including a storage for storing a firmware difference image for updating the firmware in the electronic device to a newer version, and a port for connecting the electronic device connector thereto, wherein the update utility instructs the electronic device processor (i) to apply the firmware difference image to the baseline image of the firmware to generate a newer version image of the firmware, and (ii) to replace the current image of the firmware in the electronic device storage with the thus generated newer version image of the firmware.

13 Claims, 7 Drawing Sheets

(56) References Cited

U.S. PATENT DOCUMENTS

| | | |
|---|---|---|
| 6,640,113 B1 | 10/2003 | Shin et al. |
| 6,690,947 B1 | 2/2004 | Tom |
| 6,898,283 B2 | 5/2005 | Wycherley et al. |
| 6,907,264 B1 | 6/2005 | Sterkel |
| 6,999,792 B2 | 2/2006 | Warren |
| 7,085,542 B2 * | 8/2006 | Dietrich et al. ............ 455/90.3 |
| 7,194,285 B2 | 3/2007 | Tom |
| 7,266,391 B2 | 9/2007 | Warren |
| 7,313,791 B1 * | 12/2007 | Chen et al. .................. 717/170 |
| 7,477,919 B2 | 1/2009 | Warren |
| 7,480,907 B1 * | 1/2009 | Marolia et al. ............... 717/174 |
| 7,515,937 B2 | 4/2009 | Lee |
| 7,814,474 B2 * | 10/2010 | Chen et al. .................. 717/168 |
| 8,180,395 B2 * | 5/2012 | Moran et al. ............ 455/556.1 |
| 2002/0090980 A1 | 7/2002 | Wilcox et al. |
| 2002/0151327 A1 | 10/2002 | Levitt |
| 2004/0088694 A1 * | 5/2004 | Ho .............................. 717/170 |
| 2004/0233930 A1 | 11/2004 | Colby, Jr. |
| 2004/0254013 A1 | 12/2004 | Quraishi et al. |
| 2004/0268005 A1 | 12/2004 | Dickie |
| 2005/0159184 A1 | 7/2005 | Kerner et al. |
| 2006/0003804 A1 | 1/2006 | Liu |
| 2006/0105722 A1 | 5/2006 | Kumar |
| 2006/0160567 A1 * | 7/2006 | Parivash .................. 455/556.2 |
| 2006/0190321 A1 | 8/2006 | Martins Nicho et al. |
| 2006/0200658 A1 | 9/2006 | Penkethman |
| 2006/0241353 A1 | 10/2006 | Makino et al. |
| 2007/0004450 A1 | 1/2007 | Parikh |
| 2007/0018957 A1 | 1/2007 | Seo |
| 2007/0079030 A1 | 4/2007 | Okuley et al. |
| 2007/0124130 A1 | 5/2007 | Brunet et al. |
| 2007/0161404 A1 | 7/2007 | Yasujima et al. |
| 2007/0169073 A1 * | 7/2007 | O'Neill et al. ............... 717/168 |
| 2007/0288583 A1 | 12/2007 | Rensin et al. |
| 2008/0009325 A1 | 1/2008 | Zinn et al. |
| 2008/0040354 A1 | 2/2008 | Ray et al. |
| 2008/0140886 A1 | 6/2008 | Izutsu |
| 2008/0148250 A1 * | 6/2008 | Motta ......................... 717/170 |

FOREIGN PATENT DOCUMENTS

| | | |
|---|---|---|
| WO | 0059247 A1 | 10/2000 |
| WO | 0186922 A1 | 11/2001 |
| WO | 03103174 A1 | 12/2003 |

* cited by examiner

UPDATING FIRMWARE ON MOBILE ELECTRONICE DEVICES

PRIORITY REFERENCE TO RELATED APPLICATIONS

This application claims benefit of U.S. Provisional Application No. 61/123,314, entitled UPDATING FIRMWARE ON MOBILE ELECTRONIC DEVICES, filed on Apr. 7, 2008 by inventor Yaron Segalov.

FIELD OF THE INVENTION

The field of the present invention is firmware for electronic devices.

BACKGROUND OF THE INVENTION

Firmware refers to programming instructions that are embedded within an electronic device. For most electronic devices, including communication devices and PDAs, the firmware is stored in the device's memory. The electronic device enables reading and executing the programming instructions, but does not enable modification of the instructions. Unlike software, firmware cannot be modified by application programs. Instead, modification of firmware requires special external hardware. Examples of firmware include computer programs within a read-only memory (ROM) integrated circuit chip, and computer programs embedded within an erasable programmable read-only memory (EPROM) chip.

Firmware in an electronic device needs to be updated from time to time. Updating firmware is done differently than updating software. Generally, software is updated by downloading newer software to a computer storage, and reading the newer software therefrom. In distinction, since electronic devices typically have only limited storage space, firmware updates are made by a manufacturer of the electronic device directly into the device's memory.

When updating firmware from a current version, say, version x, to a new version, say, version y, it is of advantage to generate a difference image, referred to herein as the "diff image" and denoted herein by x→y, representing the difference between version x and version y; and to send only the diff image file for updating the firmware from version x to version y. The electronic device activates an update utility that receives the diff image and updates the firmware with minimal computational and storage space requirements.

Reference is now made to FIG. 1, which is a flowchart of a prior art method for updating firmware on an electronic device via an update server. At step 11, the electronic device reports its current firmware version, say, version x, to a remote firmware update server. At step 12, the update server sends a diff image, x→y, between version x and the new version, say, version y. At step 13, the electronic device receives the diff image x→y. At step 14, the electronic device executes its update utility, which applies the diff image x→y to the current version x, to generate the new version y of the firmware.

For many electronic devices, steps 11 and 12 are performed via over the air communication. A drawback with the use of over the air communication to request and receive the data for firmware update is the time and expense occurred. Use of a diff image minimizes the amount of data transported between the update server and the electronic device, thus saving time and expense—but nevertheless time and expense is occurred.

It would thus be of advantage to update firmware of electronic devices without requiring over the air communication between the electronic device and a remote update server.

SUMMARY OF THE DESCRIPTION

Aspects of the present invention relate to updating firmware of an electronic device by attaching the device to a second device that serves as a jacket for the first device. The electronic device stores images of two versions of its firmware; namely, an image of a current version and an image of a baseline version. The current version of the firmware is used for operating the electronic device, and the baseline version is used for updating the firmware. The jacket has stored therein firmware diff image data that, when applied to the baseline image of the firmware stored in the electronic device, generates a new image of the firmware. By storing two versions of the firmware in the electronic device (current and baseline), only a single diff image is required to be stored in the jacket in order to update all older versions of the firmware. As a result, jacket storage space required for updating firmware is minimized.

The present invention is of advantage for updating firmware on a modular cell phone that may be housed within a jacket. When the cell phone is housed within a jacket, an enhanced cell phone/jacket combination device is thereby obtained, and also the firmware on the cell phone is updated. Over the air communication for updating the firmware is thus eliminated.

There is thus provided in accordance with an embodiment of the present invention a system for updating firmware on electronic devices, including an electronic device, including a processor, a storage coupled with the processor for storing a current image of firmware that includes programmed instructions for the processor and a baseline image of firmware, an update utility coupled with the processor for instructing the processor to update the firmware stored in the storage, and a connector coupled with the processor for connecting the electronic device to a jacket, thereby enabling communication between the electronic device and the jacket, and a jacket, including a storage for storing a firmware difference image for updating the firmware in the electronic device to a newer version, and a port for connecting the electronic device connector thereto, wherein the update utility instructs said electronic device processor (i) to apply the firmware difference image to the baseline image of the firmware to generate a newer version image of the firmware, and (ii) to replace the current image of the firmware in the electronic device storage with the thus generated newer version image of the firmware, in response to connecting the electronic device connector to said jacket port.

There is additionally provided in accordance with an embodiment of the present invention a method for updating firmware on electronic devices, including, in response to an electronic device being attached to a jacket, reading a data block from a baseline image of firmware stored on the electronic device, further reading a data block from a difference image of firmware stored on the jacket, combining the data block from the difference image to the data block from the baseline image to generate a data block for a new image of firmware, replacing a current image of firmware stored on the electronic device with the data block for the new image of firmware generated by said combining, and repeating the reading, the further reading, the combining and the replacing until all required data blocks for the new image of firmware are generated.

There is further provided in accordance with an embodiment of the present invention a system for updating firmware on electronic devices, including an electronic device, including a processor, a storage coupled with the processor for storing a current image of firmware that includes programmed instructions for the processor and a baseline image of firmware, an update utility coupled with the processor for instructing the processor to update the firmware stored in the storage, and a modem coupled with the processor for enabling short range wireless communication between the electronic device and a jacket, and a jacket, including a storage for storing a firmware difference image for updating the firmware in the electronic device to a newer version, and a modem coupled with the storage for enabling short range wireless communication between the jacket and the electronic device, wherein the update utility instructs the electronic device processor (i) to apply the firmware difference image to the baseline image of the firmware to generate a newer version image of the firmware, and (ii) to replace the current image of the firmware in the electronic device storage with the thus generated newer version image of the firmware, in response to opening a short range wireless communication channel between the electronic device and the jacket.

There is yet further provided in accordance with an embodiment of the present invention an electronic device with firmware upgrade capability, including a processor, a storage coupled with the processor for storing a current image of firmware that includes programmed instructions for the processor, and a baseline image of firmware, an update utility coupled with the processor for instructing the processor to update the firmware stored in the storage, and a network connection, for downloading a firmware difference image from an update server to the electronic device, wherein the update utility instructs the processor (i) to download the firmware difference image from the update server to the electronic device, (ii) to apply the downloaded firmware difference image to the baseline image of the firmware to generate a newer version image of the firmware, and (iii) to replace the current image of the firmware in the storage with the thus generated newer version image of the firmware.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to updating firmware on an electronic device by attaching the device to a second device that serves as a jacket for the first device.

Although the present invention applies to a wide variety of electronic devices and jackets, for the sake of definitiveness, the ensuing description relates primarily to an embodiment of the present invention wherein the electronic device is a modular cell phone, and the second device is a jacket into which the modular cell phone is inserted. The jacket enhances the modular cell phone by providing an enhanced user interface therefor, and additional capabilities such as a media player. The modular cell phone enhances the jacket by providing wireless communication. The jacket may have standalone operation capability, in which case it is also referred to as a host. Alternatively, the jacket may only be able to operate in cooperation with the modular cell phone.

Figure 2:
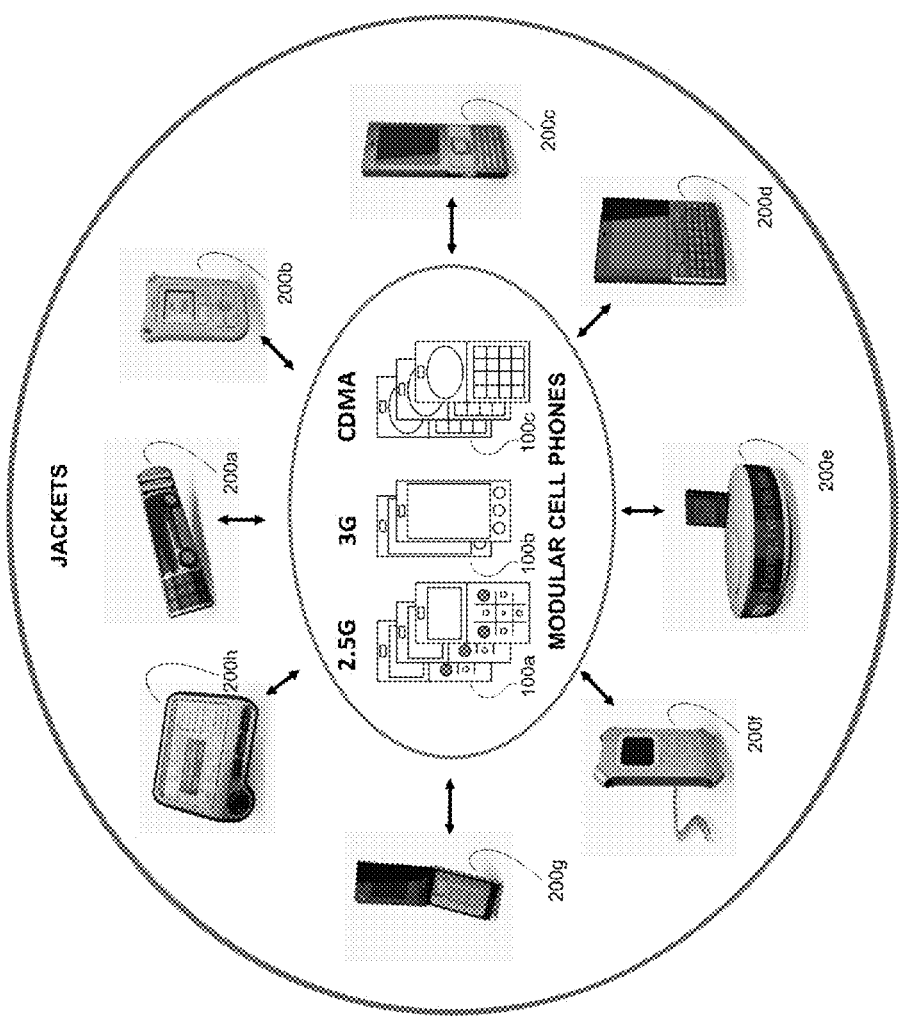
FIG. 2 is an illustration of a plurality of modular cell phones and a plurality of jackets, in accordance with an embodiment of the present invention.

Reference is now made to FIG. 2, which is an illustration of a plurality of modular cell phones 100a-100c, including 2.5G and 3G phones for a GSM network, and CDMA phones for a CDMA network, and a plurality of jackets 200a-200h. In accordance with an embodiment of the present invention, any one of the modular cell phones 100a-100c may be inserted into any one of the jackets 200a-200h, to obtain an enhanced cell phone/jacket combination.

Figure 3:
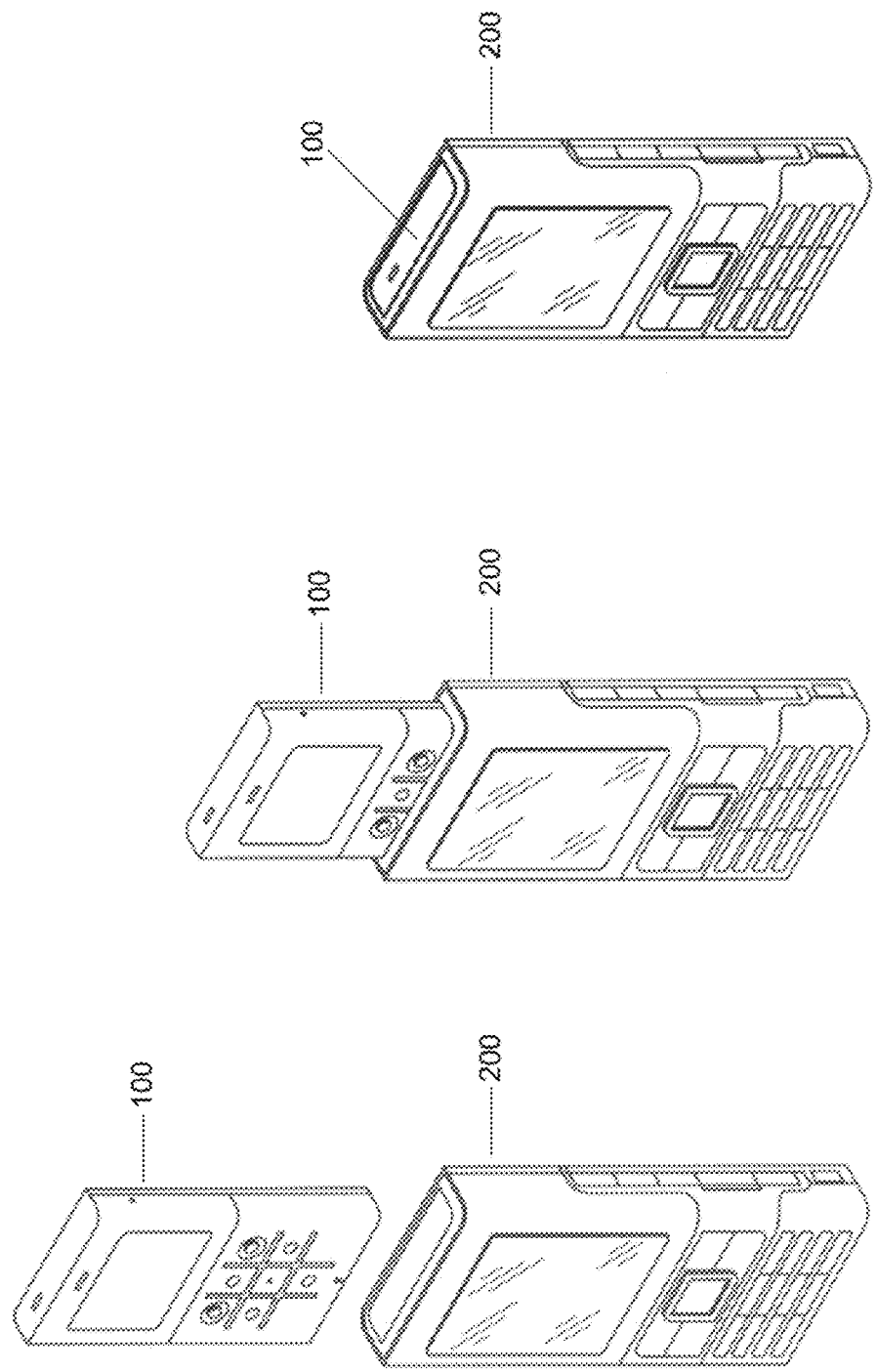
FIG. 3 is an illustration of a modular cell phone being inserted into a jacket, to obtain an enhanced cell phone/jacket combination, in accordance with an embodiment of the present invention.

Reference is now made to FIG. 3, which is an illustration of a modular cell phone 100 being inserted into a jacket 200, to obtain an enhanced cell phone/jacket combination, in accordance with an embodiment of the present invention.

Figure 4:
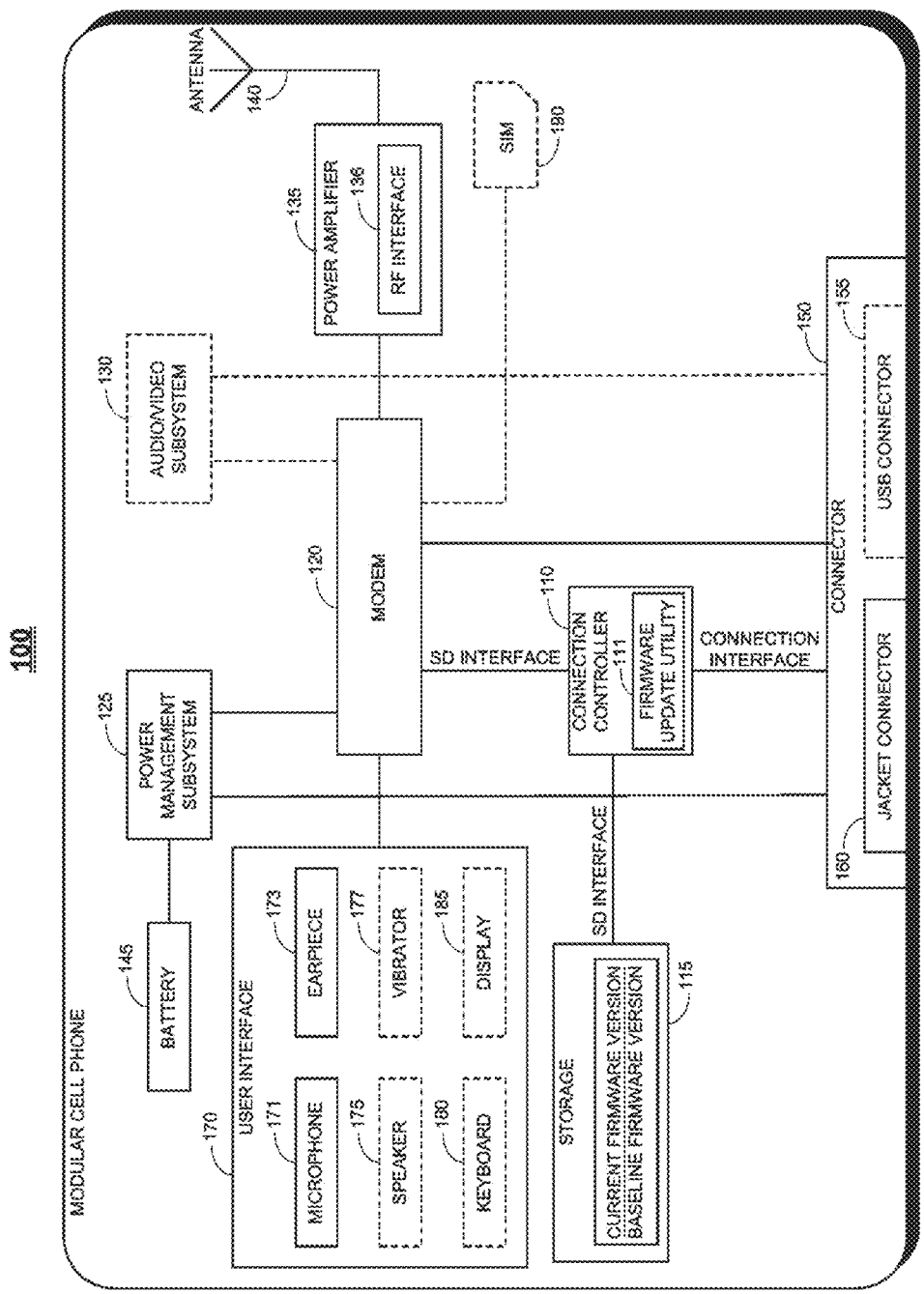
FIG. 4 is a simplified block diagram of a modular cell phone, in accordance with an embodiment of the present invention.

Reference is now made to FIG. 4, which is a simplified block diagram of modular cell phone 100, in accordance with an embodiment of the present invention. Modular cell phone 100 includes six primary components, as follows: a connection controller 110, a memory storage 115, a modem 120 for sending and receiving data and voice communications, a power management subsystem 125, a power amplifier 135 and a cell phone user interface 170.

Connection controller 110 executes programmed instructions that control the data flow between modular cell phone 100 and jacket 200. Connection controller 110 includes a firmware update utility 111 that updates the version of the firmware stored in storage 115 from time to time. As explained below with reference to FIGS. 6 and 7, storage 115 stores both a current version and a baseline version of the firmware. Storage 115 may be NOR, NAND, SD or such other non-volatile memory. Modem 120 controls the communication functionality of modular cell phone 100. Power management subsystem 125 includes charging circuitry for charging a battery 145. Power amplifier 135 includes a radio frequency (RF) interface 136, and is connected to an antenna 140. Cell phone user interface 170 includes a microphone 171 and an earpiece 173. Cell phone user interface 170 also includes an optional speaker 175, vibrator 177, keyboard 180 and display 185. It will be appreciated by those skilled in the art that cell phone user interface 170 may include additional components.

Modular cell phone 100 includes an optional audio/video subsystem 130, which includes inter alia a voice, audio and video interface.

Modular cell phone 100 includes a connector 150, which includes a jacket connector 160 and an optional USB connector 155. Modular cell phone 100 optionally includes a SIM 190.

Figure 1:
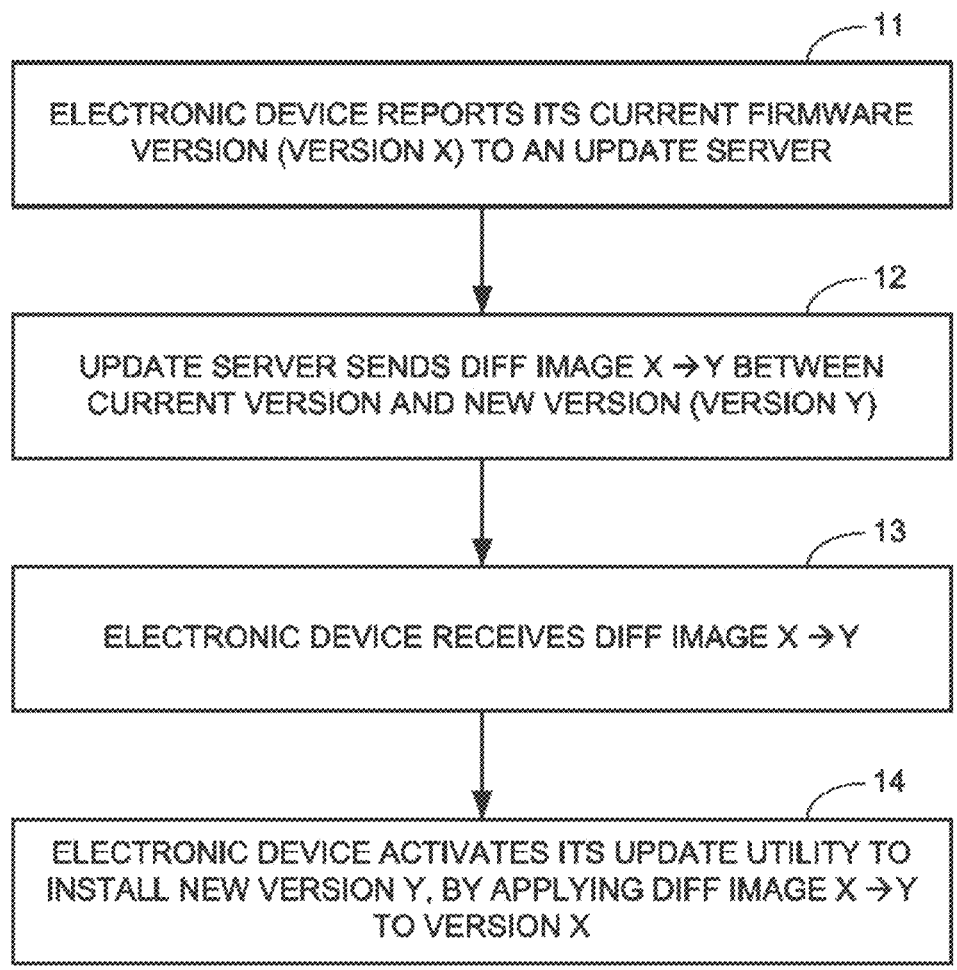
FIG. 1 is a flowchart of a prior art method for updating firmware on an electronic device via an update server.

Modular cell phone 100 operates in standalone mode or in conjunction with a jacket, such as any of jackets 200a-200h shown in FIG. 1, when it is attached thereto via jacket connector 160.

In accordance with an embodiment of the present invention, the interface between connection controller 110 and storage 115, and the interface between connection controller 110 and modem 120 are SD interfaces. The interface between connection controller 110 and jacket connector 160 is a customized connection interface.

Figure 5:
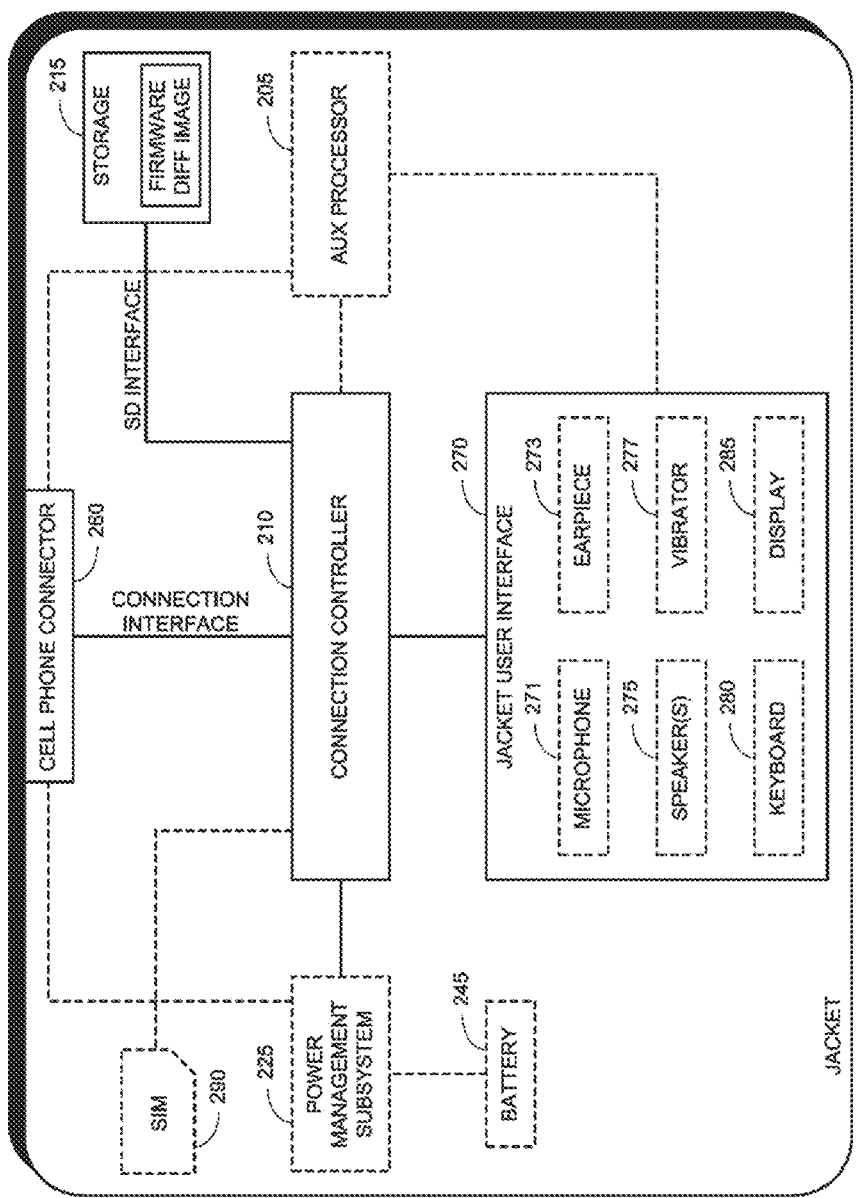
FIG. 5 is a simplified block diagram of a jacket, in accordance with an embodiment of the present invention.

Reference is now made to FIG. 5, which is a simplified block diagram of jacket 200, in accordance with an embodiment of the present invention. Jacket 200 includes a connection controller 210, a storage 215, and a cell phone connector 260 for use when modular cell phone 100 is attached to jacket 200 via the modular cell phone's jacket connector 160. Storage 215 stores a firmware diff image, for use in updating the version of the firmware stored in modular cell phone 100. Jacket 200 includes an optional auxiliary processor 205, an optional power management subsystem 225, an optional battery 245, and an optional SIM 290.

Jacket 200 includes a jacket user interface 270 including an optional microphone 271, an optional earpiece 273, an optional mono speaker or optional stereo speakers 275, an optional vibrator 277, an optional keyboard 280 and an optional display 285. It will be appreciated by those skilled in the art that jacket user interface 270 may include additional components.

In accordance with an embodiment of the present invention, the interface between connection controller 210 and storage 215 is an SD interface. The interface between connection controller 210 and cell phone 260 is a customized connection interface.

It will be appreciated by those skilled in the art that the connection between modular cell phone 100 and jacket 200 may be via a wired connection or a wireless connection.

In accordance with an embodiment of the present invention, jacket 200 is preloaded with the newest version of the firmware for modular cell phone 100, and the current firmware in modular cell phone 100 is updated via jacket 200, instead of via a network over the air.

In principle, if the current version, y, of the firmware is the $(n+1)^{st}$ version, then modular cell phone 100 may currently have any of the n previous versions of the firmware in its memory. Alternatively, modular cell phone 100 may already have the newest version in its memory. Thus it would appear that in order to accommodate all modular cell phones 100, jacket 200 needs to store either the entire image of firmware version y, or all of the diff images x→y for x=1, 2, . . . , n. In order not to have to store so much data in the limited storage space of jacket 200, a baseline version of the firmware, denoted by version 0, is stored in modular cell phone 100, in addition to the current version x that is stored therein. Consequently it suffices to store the single diff image 0→y in jacket 200. Since the baseline version is generally not the current firmware running in modular cell phone 100, the baseline version may be stored in a compressed format, in order to reduce the memory required of modular cell phone 100.

Figure 6:
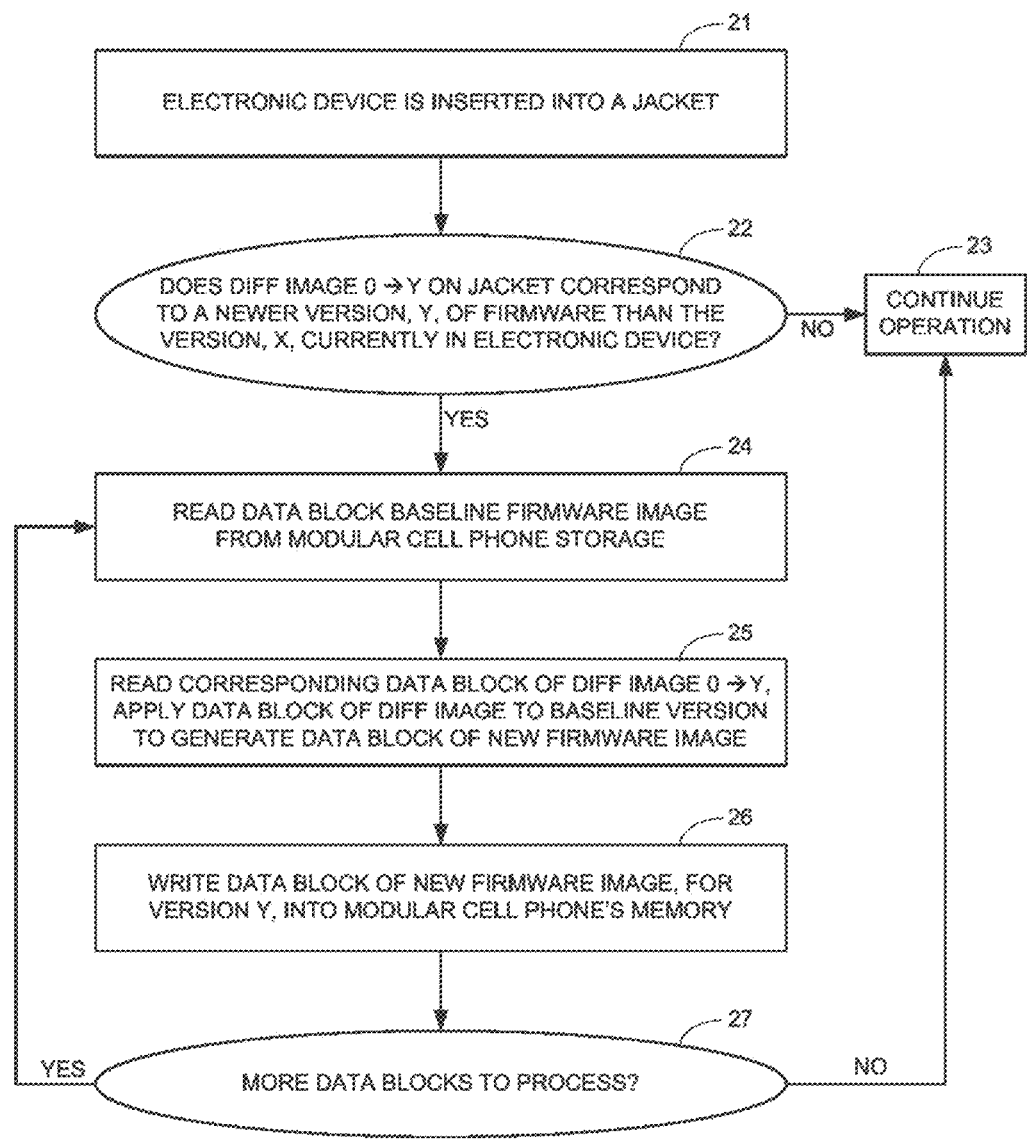
FIG. 6 is a simplified flowchart of a method for updating firmware on an electronic device via a jacket, in accordance with an embodiment of the present invention.

In this regard, reference is now made to FIG. 6, which is a simplified flowchart of a method for updating firmware on an electronic device via a jacket, in accordance with an embodiment of the present invention. At step 21 the electronic device is inserted into the jacket. The jacket contains a diff image 0→y for updating firmware from baseline version 0 to new version y. At step 22 a determination is made if version y is newer than the version of firmware, version x, currently stored in the electronic device. If not, then operation continues at step 23.

Otherwise, if version y is newer than version x, then at step 24 a data block of the baseline image of the firmware, version 0, is read from the memory of the electronic device. At step 25 the corresponding data block of the diff image 0→y is read, and applied to the baseline version 0, to generate the corresponding data block of firmware version y. At step 26 the data block of firmware version y is written to the memory of the electronic device. At step 27 a determination is made whether or not there are more data blocks to process. If so, then processing loops back to step 24 to process a next data block. Otherwise, if all data blocks have been processed, then processing continues at step 23.

As mentioned hereinabove, in some embodiments of the present invention the baseline image stored in the electronic device is compressed, in order to reduce memory requirements. Generally, the baseline image is compressed in sectors, and therefore may be decompressed in sectors, rather than all at once. In these embodiments, step 24 is modified to include reading a compressed data block of the baseline image of the firmware, version 0, from the memory of the electronic device, and decompressing the compressed data block. After step 25, the decompressed data block is deleted to free up memory. Thus memory required of the electronic device for storing the baseline image is minimized.

In an alternate embodiment of the present invention, if the electronic device has sufficient free memory to store the entire diff image 0→y, then the entire image may be copied to the electronic device and steps 24-26 may be performed on the full images without the need to loop over individual data blocks. Updating full firmware images at once accelerates the update process, but requires additional memory in the electronic device.

Figure 7:
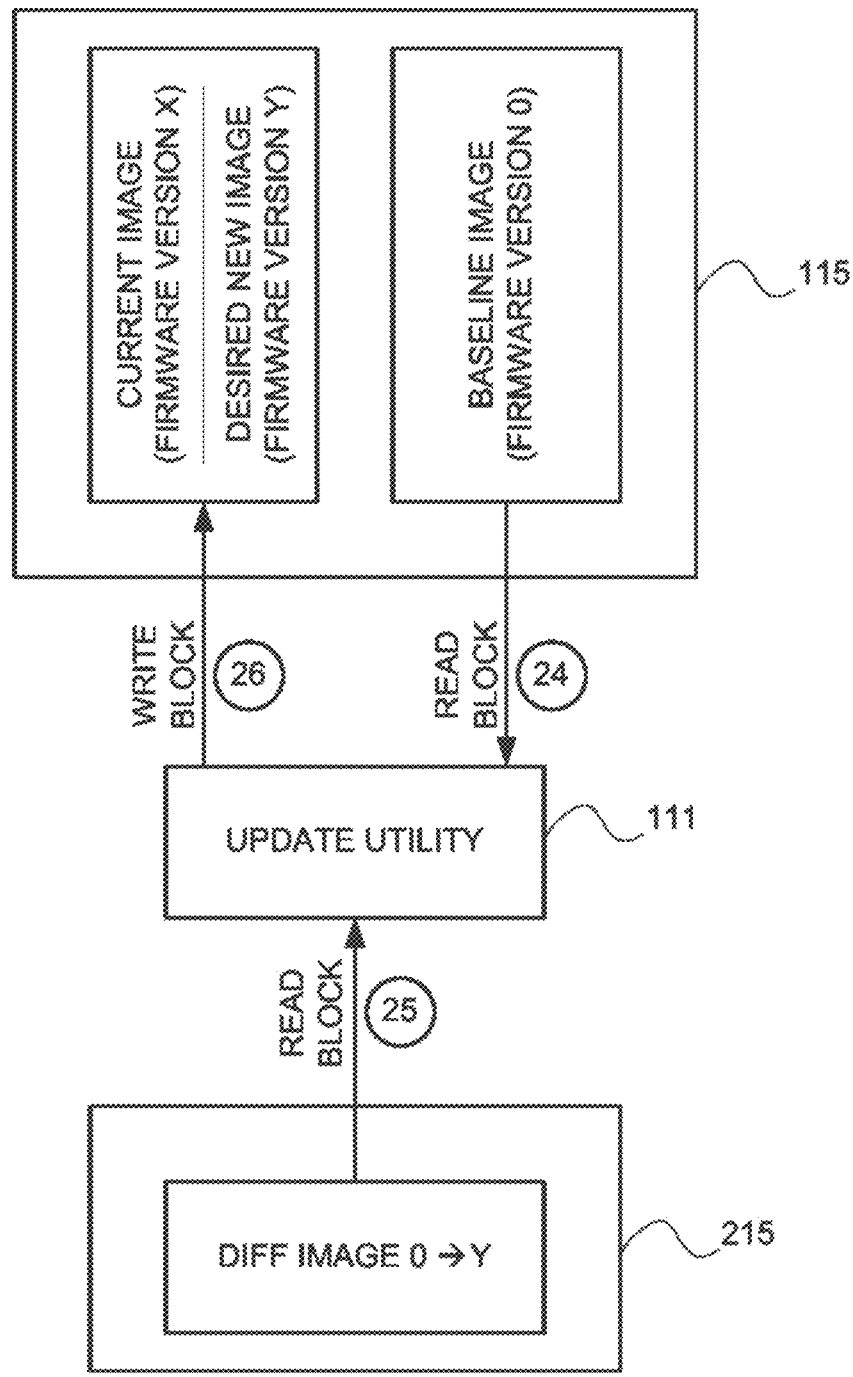
FIG. 7 is a simplified workflow process diagram of a method for updating firmware in an electronic device, in accordance with an embodiment of the present invention.

Reference is now made to FIG. 7, which is a simplified workflow process diagram of a method for updating firmware in an electronic device, in accordance with an embodiment of the present invention. As shown in FIG. 7, the modular cell phone's update utility 111 receives as input a block of data from the diff image 0→y, and a block of data from the baseline image, version 0. Update utility 111 generates as output a block of data for an image of the new firmware version y. The output block is written over the corresponding block of data from the currently stored image of firmware version x.

Specifically, at process step 24 update utility 111 reads a block of baseline image data from cell phone storage 115, and at process step 25 update utility 111 reads a corresponding block of diff image data from jacket storage 215. At process step 26, update utility 111 applies the diff image data to the baseline image data to generate a corresponding block of image data for the new firmware version y. Update utility 111 writes the output block over the corresponding block of data stored in storage 115 for current firmware version x. The process thus continues until all blocks for the image of firmware version y are generated.

In an alternate embodiment of the present invention, the output block may be written to a different storage location at step 26, instead of overwriting the corresponding block of firmware version x.

In distinction to the process shown in FIG. 7, prior art processes do not use a baseline version of firmware. Prior art processes read from current firmware version x instead of from baseline firmware version 0, at step 24.

In one embodiment of the present invention, storage 115 includes non-volatile memory, e.g., NOR memory, and modem 120 includes RAM memory. Alternatively, the RAM memory may be a separate chip in modular cell phone 100. The firmware is stored in the NOR memory, and is updated when modular cell phone 100 is rebooted. In order for modular cell phone 100 to determine during reboot whether or not to update its firmware, a flag is set in the cell phone's RAM to indicate whether or not a newer version of the firmware than current version x is available. The flag is set to TRUE when jacket 200 indicates that a newer version is available. The flag is stored in RAM since, otherwise, were it to be stored in NOR, then it may be overwritten during the firmware upgrade.

Subsequently, upon reboot from RAM, modular cell phone 100 performs the following logic:

```
if (FLAG == FALSE) then goto NOR;         /regular operation from NOR
else {              /FLAG = TRUE, indicating that a firmware upgrade
    is available firmware upgrade to NOR; /apply diff to baseline and
    write output to NOR
    FLAG = FALSE;                         /clear FLAG
    reboot;
}
```

In reading the above description, persons skilled in the art will realize that there are many apparent variations that can be applied to the methods and systems described. Thus it will be appreciated that the connection between modular cell phone 100 and jacket 200 may be any physical or wireless connection, and is not limited to an arrangement where jacket 200 is a casing for modular cell phone 100 as illustrated in FIG. 3. Modular cell phone 100 may be attached to jacket 200 externally, via direct connection or via a cable. Modular cell phone 100 may be connected to jacket 200 via short range wireless communication, such as Bluetooth communication. Modular cell phone 100 may be positioned partially inside and partially outside of jacket 200, entirely inside jacket 200, or entirely outside of jacket 200.

It will further be appreciated that jacket 200 may access another communication channel, such as an Internet connection, in addition to the limited communication channel accessible by modular cell phone 100. For example, jacket 200 may be a host device, including inter alia a personal computer; or jacket 200 may connect to a host device, such as a personal computer. When jacket 200 has access to the other communication channel, the required diff image 0→y may be downloaded to jacket 200 via such other channel. For example, the diff image 0→y may be downloaded to jacket 200 over the Internet.

It will further be appreciated by those skilled in the art that the logic of FIGS. 6 and 7 applies to remote update servers, in addition to jackets. I.e., the diff image 0→y may be provided to modular cell phone 100 via an update server, instead of or in addition to being provided by jacket 200.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system for updating firmware on electronic devices, comprising:
   an electronic device, comprising:
      a processor;
      non-volatile NOR storage coupled with said processor for storing over time different ones of a plurality of current images of firmware, each image comprising programmed instructions for said processor, and for storing a baseline image of firmware in a compressed format, wherein the current images of firmware and the baseline image of firmware are each stored as multiple data blocks;
      random access memory for storing a flag indicating whether a newer version of firmware is available;
      an update utility coupled with said processor for instructing said processor to set the flag each time that a newer version of firmware is available, to update the firmware stored in said storage, upon reboot of the electronic device, when the flag indicates that a newer version of firmware is available, and to unset the flag after the firmware is updated; and
      a connector coupled with said processor for connecting the electronic device to a jacket, thereby enabling communication between the electronic device and the jacket; and
   a jacket, comprising:
      a storage for storing over time different ones of a plurality of firmware difference images, each image for updating the firmware in said electronic device to a newer version; and
      a port for connecting said electronic device connector thereto,
   wherein said update utility updates the firmware stored in said electronic device storage by instructing said electronic device processor to sequentially, for each data block of the baseline image, (i) decompress the compressed data block of the compressed baseline image of the firmware, (ii) read the corresponding data block of the firmware difference image currently in said jacket storage, (iii) apply the corresponding data block of the firmware difference image to the decompressed data block to generate the corresponding data block of a newer version image of the firmware, and (iv) replace the data block of the current image of the firmware in said electronic device storage with the thus generated data block, in response to connecting said electronic device connector to said jacket port,
   and wherein the different ones of the firmware difference images are applied to the same baseline image of the firmware.

2. The system of claim 1 further comprising a cable for connecting said electronic device connector to said jacket port.

3. The system of claim 1 wherein said jacket further comprises an Internet connection, for downloading the firmware difference images from the Internet to said jacket.

4. The system of claim 1 wherein said jacket further comprises a host connection, for downloading the firmware difference images from a host device to said jacket.

5. The system of claim 1 wherein said update utility instructs said processor to confirm that the current image of the firmware in said electronic device is not the newer version image of the firmware, and to only perform instructions (i) and (ii) if such confirmation is affirmative.

6. The system of claim 1 wherein said electronic device comprises a modular cell phone.

7. The system of claim 6 wherein said jacket further comprises a media player.

8. The system of claim 6 wherein said jacket further comprises a digital camera.

9. The system of claim 6 wherein said jacket further comprises a PDA.

10. The system of claim 6 wherein said jacket further comprises a personal computer.

11. A system for updating firmware on electronic devices, comprising:
an electronic device, comprising:
a processor;
non-volatile NOR storage coupled with said processor for storing over time different ones of a plurality of current images of firmware, each image comprising programmed instructions for said processor, and for storing a baseline image of firmware in a compressed format, wherein the current images of firmware and the baseline image of firmware and each stored as multiple data blocks;
random access memory for storing a flag indicating whether a newer version of firmware is available;
an update utility coupled with said processor for instructing said processor to set the flag each time that a newer version of firmware is available, to update the firmware stored in said storage, upon reboot of the electronic device, when the flag indicates that a newer version of firmware is available, and to unset the flag after the firmware is updated; and
a modem coupled with said processor for enabling short range wireless communication between the electronic device and a jacket; and
a jacket, comprising:
a storage for storing over time different ones of a plurality of firmware difference images, each image for updating the firmware in said electronic device to a newer version; and
a modem coupled with said storage for enabling short range wireless communication between the jacket and the electronic device,
wherein said update utility updates the firmware stored in said electronic device storage by instructing said electronic device processor to sequentially, for each data block of the baseline image, (i) decompress the compressed data block of the compressed baseline image of the firmware, (ii) read the corresponding data block of the firmware difference image currently in said jacket storage, (iii) apply the corresponding data block of the firmware difference image to the decompressed data block to generate the corresponding data block of a newer version image of the firmware, and (iv) replace data block of the current image of the firmware in said electronic device storage with the thus generated data block, in response to opening a short range wireless communication channel between said electronic device and said jacket, and wherein the different ones of the firmware difference images are applied to the same baseline image.

12. An electronic device with firmware upgrade capability, comprising:
a processor;
non-volatile NOR storage coupled with said processor for storing over time different ones of a plurality of current image images of firmware, each image comprising programmed instructions for said processor, and for storing a baseline image of firmware in a compressed format, wherein the current images of firmware and the baseline image of firmware are each stored as multiple data blocks;
random access memory for storing a flag indicating whether a newer version of firmware is available;
an update utility coupled with said processor for instructing said processor to set the flag each time that a newer version of firmware is available, to update the firmware stored in said storage, upon reboot of the electronic device, when the flag indicates that a newer version of firmware is available, and to unset the flag after the firmware is updated; and
a network connection, for downloading over time different ones of a plurality of firmware difference images from an update server to the electronic device,
wherein said update utility updates the firmware stored in said electronic device storage by instructing said processor to sequentially, for each data block of the baseline image, (i) decompress the compressed data block of the compressed baseline image of the firmware, (ii) download the corresponding data block of a firmware difference image from the update server to the electronic device, (iii) apply the downloaded data block to the decompressed corresponding data block to generate the corresponding data block of a newer version image of the firmware, and (iv) replace the data block of the current image of the firmware in said storage with the thus generated data block,
and wherein the different ones of the firmware difference images are applied to the same baseline image.

13. The electronic device of claim 12 wherein said update utility instructs said processor to confirm with the update server that the current image of the firmware in the electronic device is not the newer version image of the firmware, and to only perform instructions (i), (ii) and (iii) if such confirmation is affirmative.

* * * * *